Patented Sept. 10, 1929.

1,727,447

UNITED STATES PATENT OFFICE.

SAVILLE RUSHFIRTH, OF ST. ANNES-ON-SEA, ENGLAND.

VARIABLE SPEED GEAR.

Application filed November 10, 1927, Serial No. 232,411, and in Great Britain November 17, 1926.

This invention relates to variable speed gears and in particular to gears of the kind embodying a part having an epicyclic motion the control of which provides the required alternative ratios.

The object of this invention is a gear of the above kind having an improved construction and arrangement of parts.

According to the invention the gear comprises a housing, two adjacent co-axial shafts mounted in the housing, a pinion wheel on each of the adjacent ends of the shafts, the two pinion wheels being of different diameters, a frame or casing journaled on the shafts, at least one compound pinion wheel mounted in the frame or casing to engage with the two different sized pinion wheels aforesaid, a clutch member slidably mounted on the frame or casing, alternative complementary clutch members for the sliding clutch member, one mounted on one of the shafts and the other secured to the housing, means for sliding the clutch member and a spring between the sliding clutch member and its frame or casing to cause it to engage normally with its complementary clutch member on the one shaft.

Such combination of parts constitutes a single gear unit and according to further features of the invention a variable gear may consist of two or more of such units in combination and additional ratios and a reverse ratio may be embodied in a gear unit.

The accompanying drawing illustrates one example of the improved variable speed gear consisting of two different gear units in combination, in which.

Figure 1:
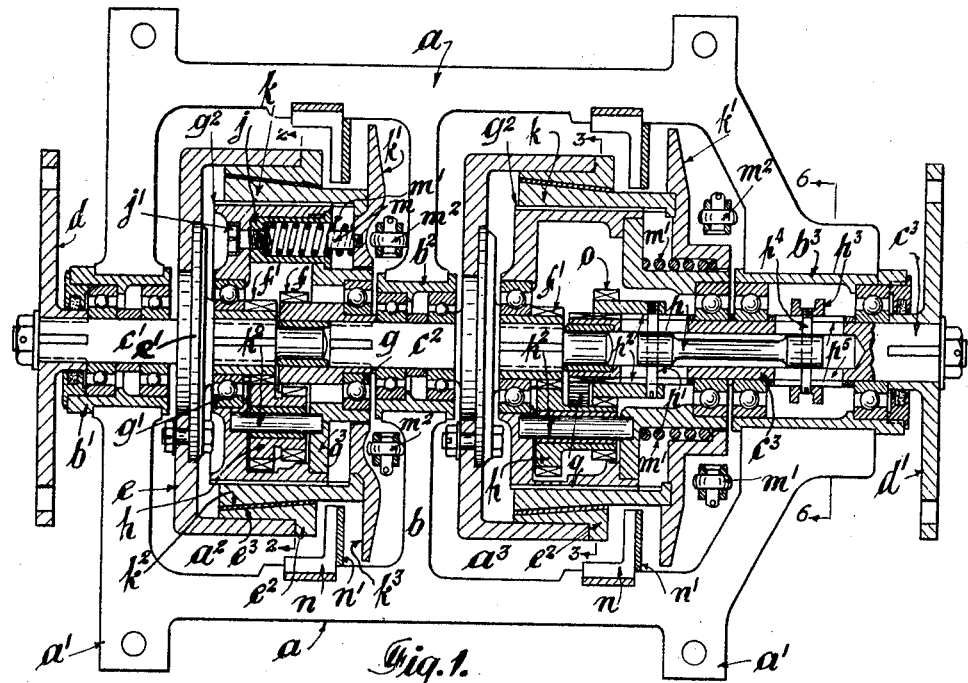
Fig. 1 is a sectional plan on line 1—1, Fig. 2.

As shown in Fig. 1, the variable gear consists of a housing $a$ provided with suitable lugs $a^1$ for attachment to the chassis of an automobile, and having two compartments $a^2$ and $a^3$ each of which is adapted to contain a variable gear unit. In the ends of the housing and in the centre partition $b$ between the two compartments are ball bearing housings $b^1$, $b^2$ and $b^3$ in which are journaled shafts $c^1$, $c^2$ and $c^3$ arranged co-axially and end to end. The outer ends of the shafts $c^1$ and $c^3$ are each provided with a spider $d$, $d^1$ respectively, for a flexible coupling of known construction.

Figure 2:
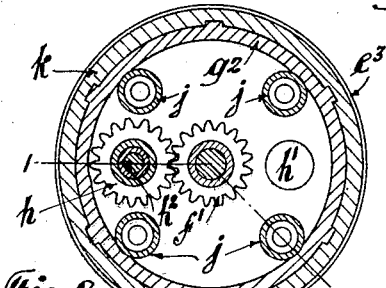
Fig. 2 is a sectional elevation of the left hand gear unit on line 2—2, Fig. 1.
Figure 3:
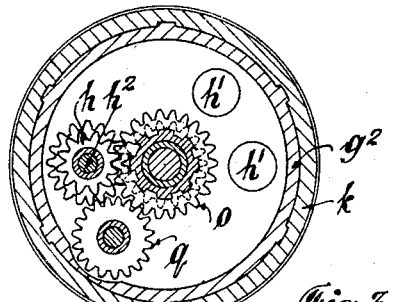
Fig. 3 is a sectional elevation of the right hand gear unit on line 3—3, Fig. 1.

The first gear unit in the compartment $a^2$ consists of a shell like clutch member $e$ secured to a flange $e^1$ on the shaft $c^1$, the clutch member having a detachable sleeve or collar $e^2$ with cone shaped clutch facing $e^3$, such collar being secured to the clutch member after assembly of the other parts of the unit. On the end of the shaft $c^2$ within the compartment $a^2$ is secured a pinion wheel $f$, overhanging the end of the shaft $c^1$ which is turned down, the wheel being bushed to form a supporting bearing thereon for the ends of the shafts. Opposite and adjacent to the pinion wheel $f$ is a smaller pinion wheel $f^1$ secured on the shaft $c^1$. Journaled on ball races $g$, $g^1$ carried on the pinions $f$, $f^1$ is a casing $g^2$ with its cover $g^3$ in which is mounted a compound pinion $h$ on a spindle $h^2$ and having toothed parts gearing with the two pinions $f$ and $f^1$. In the casing is a balance weight $h^1$ opposite the pinion $h$, and spaced equally around the casing are spring tubes $j$ secured by screws $j^1$ and serving to fasten the cover $g^3$ of the casing, $g^2$. The outer circumference of the casing $g^2$ is splined, see Fig. 2, and on it is slidably mounted a clutch member $k$, having a disc like part $k^1$, the member $k$ having a conical clutch face $k^2$ and the part $k^1$ having a clutch face $k^3$. In the part $k$ are locating pins $m$ for springs $m^1$ provided in the spring tubes $j$, and behind the part $k^1$ is an operating fork the arms of which are provided at their extremities with anti-friction rollers $m^2$ to engage with the outer face of the part $k^1$. In the compartment $a^2$ is a stationary bracket $n$ carrying a friction face $n^1$ for the engagement of the clutch face $k^3$ of the part $k^1$ of the sliding clutch member.

Figure 4:
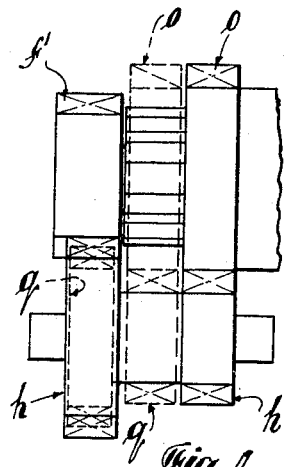
Fig. 4 is a diagram illustrative of the reverse ratio mechanism, embodied in the right hand gear unit.

The variable gear unit in the compartment $a^3$ comprises many parts similar to these in the other unit, the principal differences of construction being as follows. The shaft $c^3$ is made hollow from its inner end, the extreme inner end being bushed to fit over the spigot on the end of the shaft $c^2$. A sliding pinion wheel $o$ is provided on the inner end of the shaft $c^3$, in place of the pinion wheel $f$, sliding on splines on the end of the shaft and connected to a dumb-bell shaped operating rod $p$ within the shaft by a pin $p^1$ passing through slots $p^2$ in the shaft. The journal $b^3$ is made long enough to accommodate an operating flange $p^3$ on the shaft connected to the other end of the operating rod $p$ by a pin $p^4$ passing through slots $p^5$. Also the compound pinion $h$ is made longer leaving a space between the two toothed ends, and a reverse pinion $q$ is mounted in the casing $g^2$ such pinion meshing with one end of the pinion $h$ and having a toothed portion positioned between the two toothed portions of the pinion $h$ and adapted to be engaged by the sliding pinion wheel $o$. In Fig. 4 the dotted position of the pinion $o$ shows the position for obtaining the reverse ratio.

Figure 5:
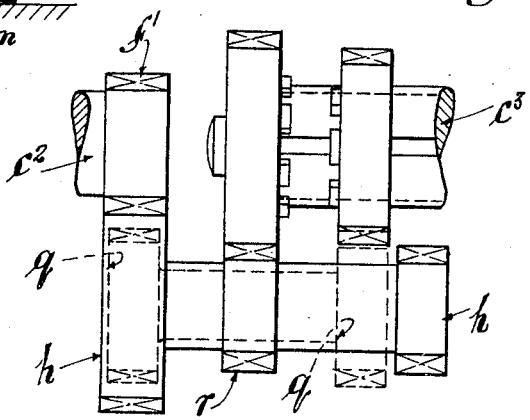
Fig. 5 is a diagram of the parts embodied in the right hand gear unit to give the third forward ratio.

In Fig. 5 is shown an arrangement wherein the reverse pinion $q$ is shown dotted behind the pinion $h$ which is also provided with an intermediate toothed portion $r$ to give a third forward ratio, or more properly a second forward ratio when using the clutch part $k^1$ and faces $k^3$ and $n^1$ of the gear unit.

Figure 6:
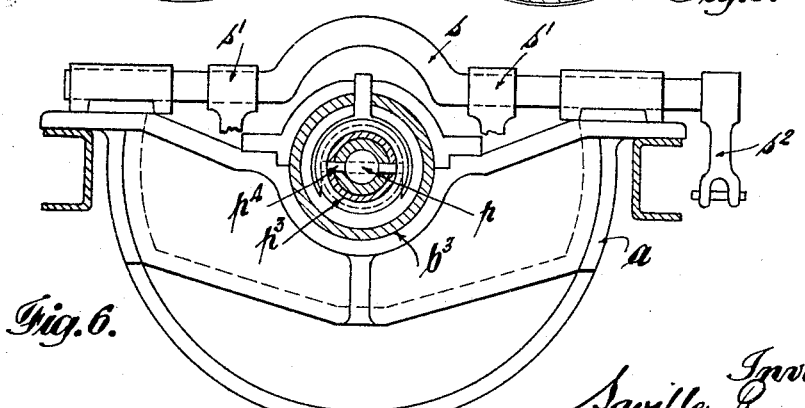
Fig. 6 is a part sectional side elevation of the gear operating mechanism and a side exterior elevation of the gear housing (taken on line 6—6 Fig. 1).

In Fig. 6 is shown part of the clutch operating mechanism or one of the units consisting of a cranked shaft $s$ with arms $s^1$ on the ends of which are the anti-friction rollers $m^2$, the shaft being turned by means of a forked operating arm $s^2$.

Figure 7:
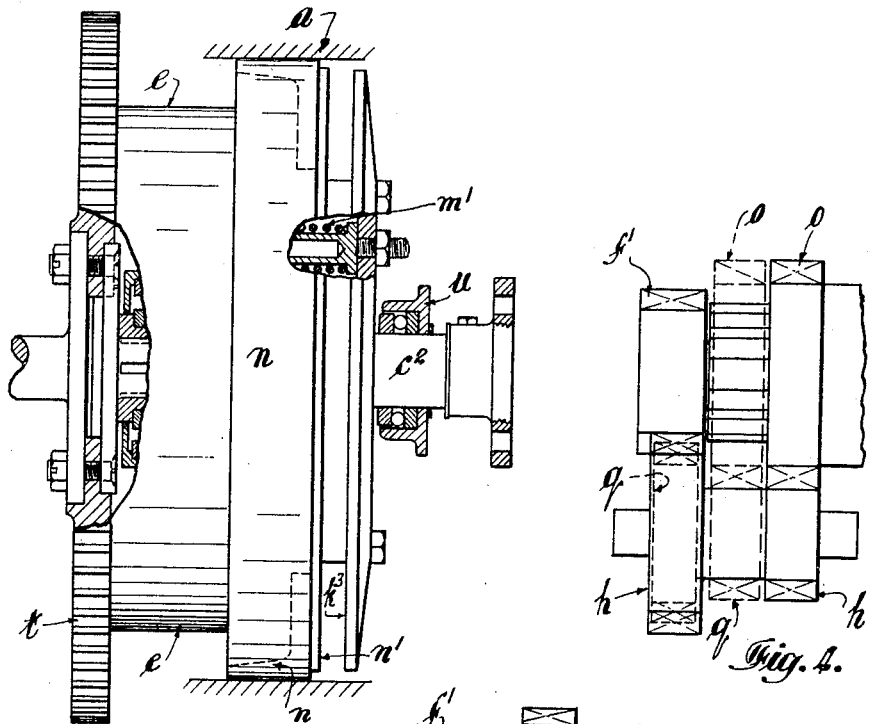
Fig. 7 is a side exterior view, partly in section, of a single gear unit arranged for use between the engine and the usual change speed gear, or Cardan shaft, of an automobile.

The unit shown in Fig. 7, illustrates the manner of constructing the gear unit so as to be built direct on to the fly wheel $t$ of an engine for an automobile, an anti-friction thrust race member $u$ being provided on the outer end of the shaft for operating the sliding clutch member.

In operation, with the engine running and the sliding clutch member of the left hand gear unit in the neutral position i. e. with neither of the clutch faces in engagement, the casing $g^2$ revolves freely while the shaft $c^2$ remains stationary. Low gear is engaged by operating the clutch mechanism to bring the clutch faces $k^3$ and $n^1$ into engagement thereby checking rotation of the casing $g^2$. The top or positive drive gear is then obtained by reversing the operation of the clutch mechanism allowing the sliding clutch member to be moved by its own springs until the conical clutch parts engage, namely the clutch face $k^2$ and the conical face $e^3$ of the collar $e^2$. In top gear a positive drive is obtained, the gear turning as a whole without relative movement of its component parts.

The same two changes can be obtained with the second gear unit the sliding pinion wheel $o$ being in the position shown. Obviously by combining the ratios thus obtained three different speed ratios may be obtained, or four if the two lower ratios are different. Reverse is obtained from the second gear unit by sliding the pinion $o$ into engagement with the pinion $q$ and using the clutch operating mechanism as for low gear. When a double, or two unit gear is employed two ratios of reverse are available as well as the one forward, and also where an extra ratio is added to either unit the extra ratios available from the gear as a whole will be increased by the number of ratios in the other unit.

The chief advantages of the gear are in its simplicity of construction and use, absolute silence when on "top" ratio when it runs without wear in the other parts of the unit provided for giving the lower ratio, the gear unit turning as a whole. The parts are easy to produce and to balance, overhanging shafts and side loads are avoided as far as possible and the gear is designed for efficient service generally.

The gear may be used separately or in conjunction with an existing gear box to provide other ratios and easy changing for at least one of such ratios.

What I claim is:—

1. A variable speed gear comprising two shafts, a housing rotatably mounted over the ends of the shafts, gearing on the ends of the shafts, differential gearing within the housing with alternative ratios engaging the gearing on the shafts, selector operating mechanism for the gearing, a stationary member adjacent to the housing, a clutch part on said stationary member, a cup-shaped clutch part overhanging said housing and a compound clutch member slidably keyed on said housing having a coacting clutch surface extending into said cup-shaped clutch part to engage the same, and a coacting clutch surface to engage alternatively with the clutch part of said stationary member, as set forth.

2. A variable speed gear comprising two shafts, a housing rotatably mounted over the ends of the shafts, a first pinion gear secured on the end of one shaft within the casing, a second or selector pinion gear slidably mounted on the end of the other shaft within the casing, differential gearing comprising a compound pinion wheel having toothed portions, one engaging the said first pinion gear and the other adapted to be engaged by the second or selector pinion gear, a reverse pinion mounted in the housing engaging the compound pinion wheel and presenting an alternative engagement for the selector pinion, selector operating mechanism for sliding the selector pinion gear, a stationary member adjacent to the housing, a clutch part on said stationary member, a cup-shaped clutch part overhanging said housing and a compound clutch member slidably keyed on said housing having a coacting clutch surface extending into said cup-shaped clutch part to engage the same, and a coacting clutch surface to engage alternatively with the clutch part of said stationary member, as set forth.

In testimony whereof I have signed my name to this specification.

SAVILLE RUSHFIRTH.